United States Patent
Ramaswamy et al.

(10) Patent No.: US 11,675,576 B2
(45) Date of Patent: Jun. 13, 2023

(54) METHODS AND SYSTEMS FOR APPLICATION DEPLOYMENT AND OPTIMIZATION

(71) Applicant: Verizon Patent and Licensing Inc., Basking Ridge, NJ (US)

(72) Inventors: Karthik Ramaswamy, Coppell, TX (US); Prashant Kumar Rajpal, Issaquah, WA (US); Sivanaga Ravi Kumar Chunduru Venkata, Irving, TX (US); Darshan Gupta, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 19 days.

(21) Appl. No.: 17/239,936

(22) Filed: Apr. 26, 2021

(65) Prior Publication Data
US 2022/0342648 A1  Oct. 27, 2022

(51) Int. Cl.
| | |
|---|---|
| *H04L 67/51* | (2022.01) |
| *G06F 9/445* | (2018.01) |
| *H04L 41/0813* | (2022.01) |
| *G06F 9/455* | (2018.01) |
| *G06F 8/60* | (2018.01) |
| *H04L 41/14* | (2022.01) |
| *H04W 16/18* | (2009.01) |

(52) U.S. Cl.
CPC ............. *G06F 8/60* (2013.01); *H04L 41/145* (2013.01); *H04W 16/18* (2013.01)

(58) Field of Classification Search
CPC ..... H04L 43/16; H04L 41/0806; H04L 41/16; H04L 41/5009; H04L 41/5041; H04L 41/0894; H04L 41/5054; H04L 41/142; H04L 47/745; H04L 47/788; H04L 41/145; G06N 3/088; G06F 8/60; H04W 16/18

See application file for complete search history.

(56) References Cited

U.S. PATENT DOCUMENTS

| | | | |
|---|---|---|---|
| 11,445,039 B2* | 9/2022 | Yoon | H04L 67/51 |
| 2019/0104030 A1* | 4/2019 | Giust | H04L 41/0816 |
| 2021/0051060 A1* | 2/2021 | Parvataneni | H04L 41/5041 |
| 2021/0099316 A1* | 4/2021 | Wang | H04M 15/8228 |

OTHER PUBLICATIONS

Paymard et al., Task Scheduling Based on Priority and Resource Allocation in Multi-User Multi-Task Mobile Edge Computing System, 7 pages (Year: 2019).*

* cited by examiner

*Primary Examiner* — Thuy Dao

(57) ABSTRACT

Systems and methods described herein provide an application priority optimization service. Application information associated with an application to be deployed at a Multi-access Edge Computing (MEC) network is received and parameters associated with execution of the application are determined based on the application information. The application is deployed at the MEC network and information associated with performance of the application is obtained. Resources allocated for execution of the application may be adjusted based on the performance of the application to create a modified application and the modified application may be executed at the MEC network.

20 Claims, 6 Drawing Sheets

METHODS AND SYSTEMS FOR APPLICATION DEPLOYMENT AND OPTIMIZATION

BACKGROUND

Multi-access Edge Computing (MEC) is an important technology for wireless operators. In MEC networks, core network capabilities and/or application-related capabilities (e.g., computational, storage, etc.) may be situated at the network edge to improve latency and reduce traffic. A customer may run multiple applications at a MEC site and each MEC site may be limited in capacity. Depending on application usage and user demand, capacity at a MEC site may be reached.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

New cellular networks offer new features and benefits, such as high bandwidth, low latency, and support for massive Internet of Things (IoT) data transfers. One enhancement made possible through these new networks is the use of MEC, including the use of edge servers. These edge servers allow network computing loads to be transferred onto the edge servers. Depending on the location of the edge servers relative to the point of attachment (e.g., a wireless station for a user device), MEC servers may provide various services and applications to user devices with minimal latency.

Typically, a MEC site may include only a few MEC servers or compute environments. Consequently, a limited number of different MEC applications may be run at any MEC site. Depending on the number of users accessing the applications at the MEC site and the resources required by the applications being run at the MEC site, a MEC site may reach capacity. If a MEC site reaches capacity, congestion may occur, which may result in a low quality of service for customers.

Implementations described herein may adjust a design and/or execution of MEC applications hosted at a MEC site based on the performance of the MEC applications. In one implementation, the design and/or execution of the MEC applications may be adjusted based on a priority of the MEC applications. For example, a developer of the MEC applications may designate a priority for each MEC application. In addition, the developer may indicate adjustments that may be made to the MEC applications when the MEC site is reaching capacity or is at capacity.

In another implementation, the design and/or execution of the MEC applications may additionally be adjusted based on user requirements. For example, different users may require access to different data provided by a MEC application. As another example, one user may require higher performance than another user. Implementations described herein may adjust the design and/or execution of the MEC applications hosted at the MEC site based on the users accessing the MEC applications and/or the requirements of the users accessing the MEC applications.

Figure 1:
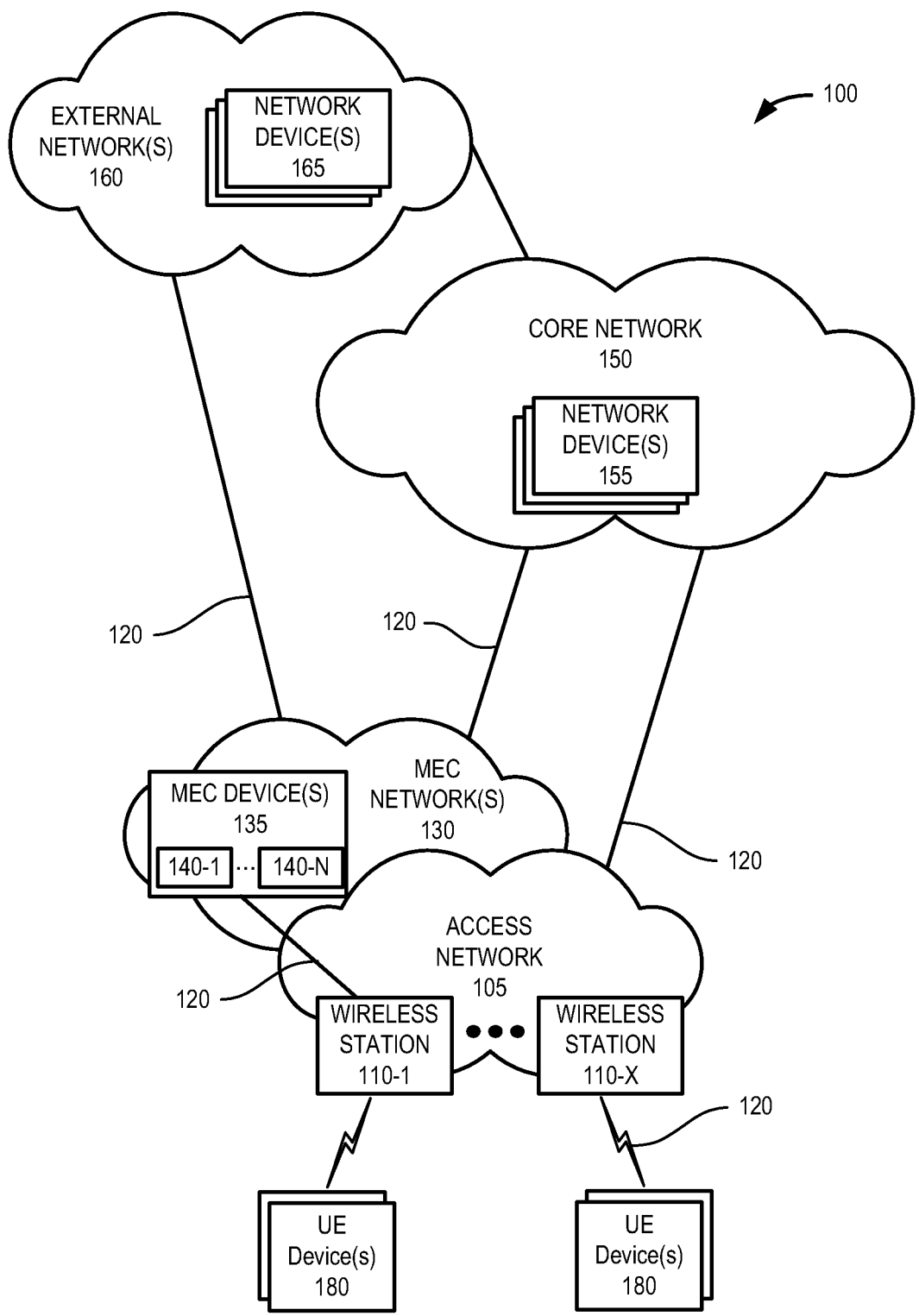
FIG. 1 illustrates an exemplary environment in which an exemplary embodiment of a MEC application priority optimization may be implemented.

FIG. 1 illustrates an exemplary environment 100 in which an embodiment of the MEC application priority optimization may be implemented. As illustrated, environment 100 includes an access network 105, MEC network(s) 130, a core network 150, and an external network 160. Access network 105 may include wireless stations 110-1 through 110-X (referred to collectively as wireless stations 110 and generally as wireless station 110). MEC network(s) 130 may include MEC devices 135 that host MEC applications 140-1 to 140-N (referred to collectively as MEC applications 140 or generally as MEC application 140); core network 150 may include network devices 155; and external network 160 may include network devices 165. Environment 100 further includes one or more user devices 180, also referred to as user equipment (UE) devices 180.

The number, the type, and the arrangement of network device and the number of user devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between user devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. Wireless stations 110 may connect to MEC network 130 via backhaul links 120, such as wired or optical links. According to various embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. In one implementation, MEC devices 135 may host MEC applications 140. MEC applications 140 may include applications that provide services to users of user devices 180. In one implementation, MEC applications 140 may provide low-latency services to users.

MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a control unit of a gNB). In other embodiments, wireless stations 110 may connect to MEC network 130 via wired (e.g., optical) backhaul links 120. In other embodiments, MEC devices 135 may be co-located with elements of access network 105 and/or core network 150. As used herein, the term "co-located" may refer to elements that are located within the same platform or subsystem of environment 100.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies to support access network 105. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network devices 155 to implement 5G network functions, such as for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. For example, the user device application/service network may provide various applications or services pertaining to broadband access in dense areas (e.g., pervasive video, smart office, operator cloud services, video/photo sharing, etc.), broadband access everywhere (e.g., 50/100 Mbps, ultralow-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices 165 that provide various applications, services, or other type of user device assets, such as servers (e.g., web, application, cloud, etc.), mass storage devices, data center devices, and/or other types of network devices pertaining to various network-related functions.

User device 180 includes a device that has computational and wireless communication capabilities. User device 180 may be implemented as a mobile device, a portable device, a stationary device, a device operated by a user, or a device not operated by a user. For example, user device 180 may be implemented as a Mobile Broadband device, a smartphone, a computer, a tablet, a netbook, a wearable device, a vehicle support system, a game system, a drone, an IoT device, a machine type communication (MTC) device, or some other type of wireless device. According to various exemplary embodiments, user device 180 may be configured to execute various types of software (e.g., applications, programs, etc.).

User device 180 may support one or multiple RATs (e.g., 4G, 5G, etc.), one or multiple frequency bands, network slicing, dual-connectivity, and so forth. Additionally, user device 180 may include one or multiple communication interfaces that provide one or multiple (e.g., simultaneous or non-simultaneous) connections via the same or different RATs, frequency bands, etc.

Figure 2:
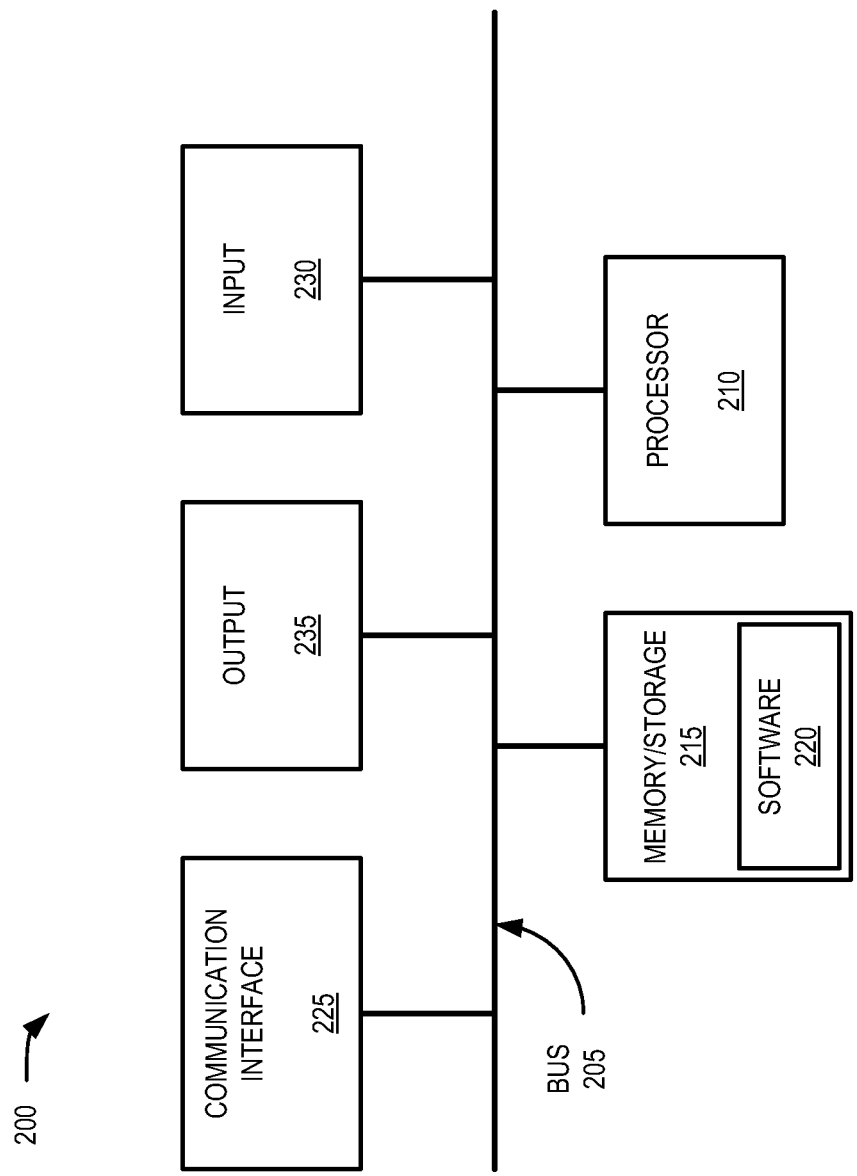
FIG. 2 illustrates exemplary components of a device that may correspond to one or more of the devices illustrated and described herein.

FIG. 2 is a diagram illustrating example components of a device 200 according to an implementation described herein. Wireless station 110, MEC device 135, network device 155, network device 165, and/or user device 180 may each include one or more devices 200. In another implementation, a device 200 may include multiple network functions. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. Additionally, for example, MEC device 135 may include logic to perform tasks, as described herein, based on software 220. Furthermore, user devices 180 may store applications that require services/resources from MEC applications 140 hosted by MEC devices 135.

Communication interface 225 permits device 200 to communicate with other devices, networks, systems, devices, and/or the like. Communication interface 225 includes one or multiple wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a communication standard and/or protocols. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
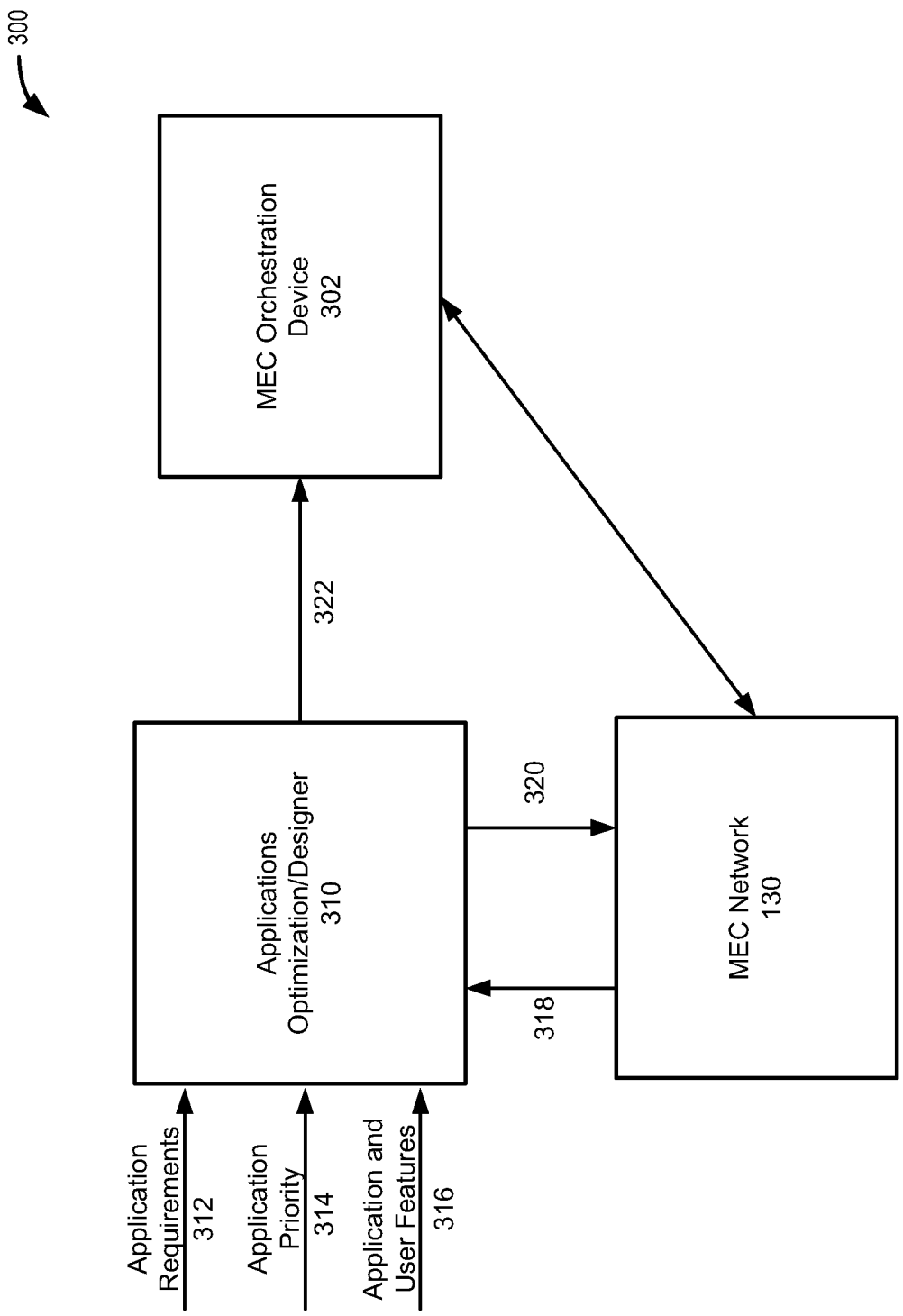
FIG. 3 is a diagram illustrating an exemplary environment for performing application priority optimization in a MEC network according to an implementation herein.

FIG. 3 is a diagram illustrating an exemplary environment 300 for performing application priority optimization in MEC network 130. Environment 300 may include MEC network 130, Applications Optimization/Designer 310, and MEC orchestration device 302.

Applications Optimization/Designer 310 may include a network device to design and/or optimize applications at MEC network 130. Applications Optimization/Designer 310 may be located at MEC network 130 or at a different network location. Applications Optimization/Designer 310 may receive inputs from a number of users, designers, and/or devices and may design and/or optimize execution of MEC applications 140 hosted at MEC network 130 based on the inputs.

MEC network 130 may host a number of MEC applications 140. Applications Optimization/Designer 310 may receive an input 312 that includes requirements associated with each MEC application 140 hosted at MEC network 130. Each MEC application 140 may have different resource requirements, different storage requirements, different network requirements, etc. Applications Optimization/Designer 310 may receive input 312 that includes the resource, storage, and/or network requirements for each MEC application 140. For example, some MEC application 140 may require higher bandwidth, compute resources, and/or wireless and wireline network resources than other MEC application 140. Applications Optimization/Designer 310 may receive the MEC application 140 requirements to determine the overall capacity and resources needed for the MEC applications 140 hosted at MEC network 130.

Applications Optimization/Designer 310 may additionally receive input 314, which includes a priority associated with one or more MEC application 140 hosted at MEC network 130. For example, an application developer may develop more than one MEC application 140 that is hosted at MEC network 130. Each MEC application 140 may be used for a different purpose and some MEC applications 140 may be more critical than other MEC applications 140. The application developer or another user (e.g., a user associated with UE device 180 executing a MEC application 140, or a service provider associated with executing a MEC application and/or operating access network 105, MEC network 130 and core network 150) may determine a priority associated with each MEC application 140. In addition, the application developer or another user may indicate that adjustments may be made to particular MEC application 140 in the event that capacity issues exist at MEC network 130. For example, the application developer may indicate that execution associated with a lower priority MEC application 140 may be adjusted if MEC network 130 is at capacity.

Applications Optimization/Designer 310 may receive input 316 including features associated with each MEC application 140. In one implementation, the features may include user type features. Different users may use different features of a MEC application 140. As one example, a supervisor of a facility may require access to a different set of data associated with MEC application 140 than another employee of the facility. As another example, a factory worker may require higher application performance for completing a job than a supervisor. Therefore, input 316 may include user features associated with each MEC application 140. Input 316 may further include resources (e.g., compute resources, storage resource, network resources, etc.) associated with different features of the MEC applications 140. Input 316 may further include additional features associated with the MEC application 140, such as whether the MEC application 140 is a location-based application.

Applications Optimization/Designer 310 may design, update and/or execute the MEC applications 140 based on inputs 312, 314, and 316. In addition, Applications Optimization/Designer 310 may receive input 318, which includes information regarding real-time compute, storage, and network resources usage (e.g., network resource usage per customer, overall network resource usage, network resource usage in particular time periods, etc.), from MEC network 130. As the MEC applications 140 are designed, deployed, and orchestrated, users may access the MEC application 140 from MEC network 130. MEC network 130 may monitor the performance of each MEC application 140 at MEC network 130. Based on the performance of each MEC application 140, Applications Optimization/Designer 310 may optimize the design and/or execution of the MEC application 140. For example, Applications Optimization/Designer 310 may optimize the design and/or execution of the MEC applications 140 based on the priorities of the MEC applications 140, the users accessing the MEC applications 140, the requirements for each MEC application 140, the performance of the MEC applications 140, and/or additional factors.

Based on the inputs received, Applications Optimization/Designer 310 may transmit output 320, which includes information regarding real-time compute, storage, and network resources per MEC application 140, to MEC network 130. In one implementation, Applications Optimization/Designer 310 may transmit output 320 to a resource orchestration device (not shown) of MEC network 130. MEC network 130 may perform resource orchestration based on receiving the information provided by Applications Optimization/Designer 310. For example, MEC network 130 may allocate and/or adjust the compute, storage, and/or network resources per application. In this way, MEC network 130 may provide a better quality of service for users accessing MEC application 140 at MEC network 130.

Applications Optimization/Designer 310 may additionally provide output 322, which includes optimization solutions per user, to MEC orchestration device 302. MEC orchestration device 302 may include a network device to manage and control use of MEC network 130. For example, MEC orchestration device 302 may connect with MEC network 130 to launch a MEC application 140, modify execution associated with a MEC application 140, etc. MEC orchestration device 302 may include logic that provides MEC selection and orchestration among MEC networks 130 and/or MEC devices 135. MEC orchestration device 302 may, for example, maintain a topology map of MEC deployments. According to an implementation, MEC orchestration device 302 may be a centralized component for MEC network 130. For example, MEC orchestration device 302 may be co-located with one or more network devices 155 of core network 150. In another implementation, MEC orchestration device 302 may be located in a local MEC network 130 location or external network 160. MEC orchestration device 302 may monitor network loads, manage capacity, and select a MEC device 135 that satisfies a performance metric requirement and a capability requirement for a MEC service requested by UE device 180.

MEC orchestration device 302 may receive the optimization solutions per user from Applications Optimizer/Designer 310 and may orchestrate application components of the MEC application 140 based on, for example, time of day, user location, etc., and may adjust application components (e.g., scale up/down components) based on user profiles, developer priority, and/or additional factors. Based on the information received from Applications Optimization/Designer 310, MEC orchestration device 302 may orchestrate the optimized design and/or execution for the MEC application 140 and deploy the MEC application 140 for use by users. The design and/or execution of the MEC application 140 may be continuously adjusted and orchestrated based on the resource, storage, and/or network information per user being monitored at MEC network 130. In this way, as the number and type of users accessing the MEC application 140 at MEC network 130 changes, the design and/or execution of MEC application 140 may be adjusted to provide the optimal experience for each user.

Figure 4:
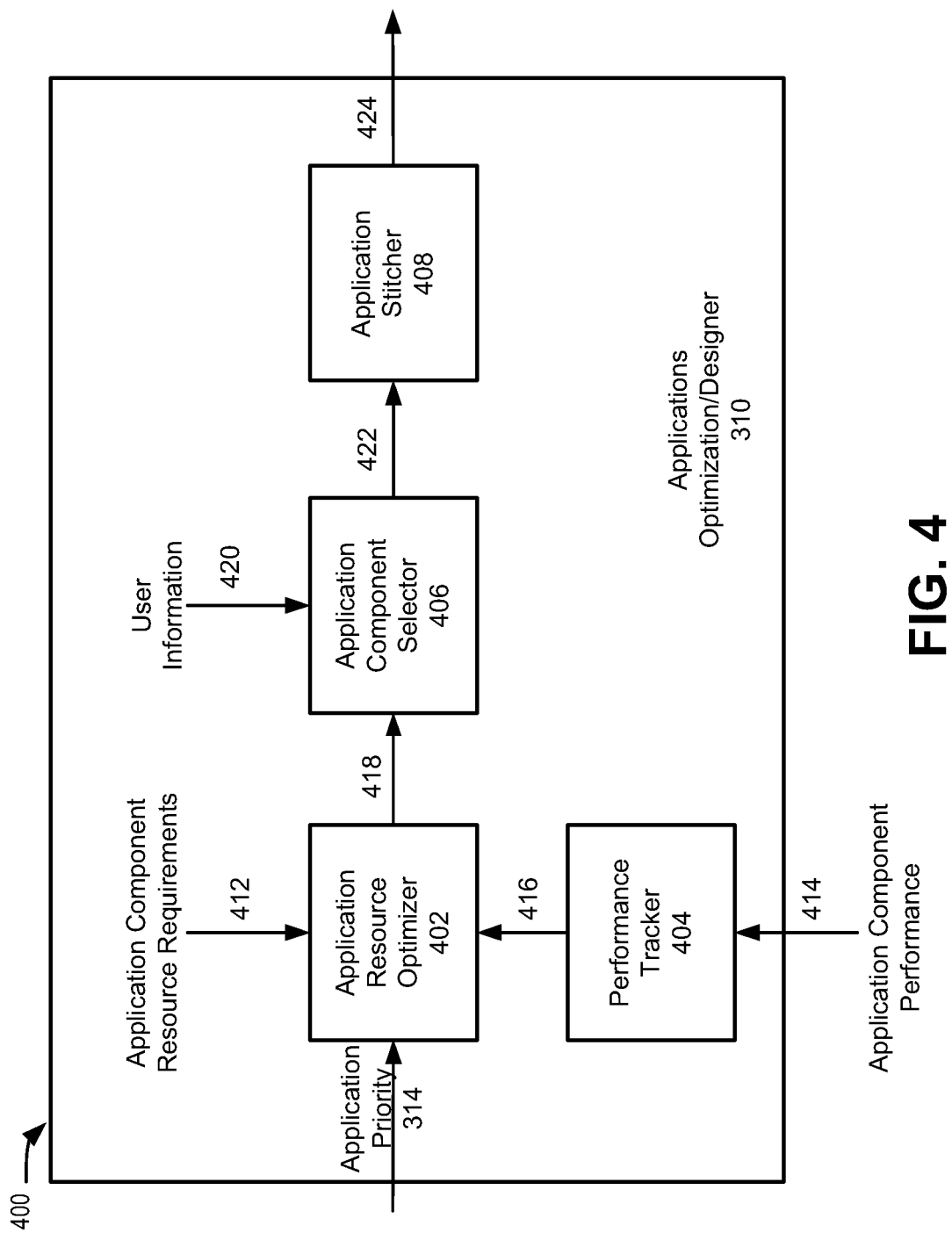
FIG. 4 is a diagram illustrating exemplary components of a device for performing application priority optimization according to an implementation herein.

FIG. 4 is a diagram illustrating exemplary components 400 of Applications Optimizer/Designer 310 for performing application priority optimization. Applications Optimizer/Designer 310 may include an Application Resource Optimizer 402, Performance Tracker 404, Application Component Selector 406, and an Application Stitcher 408.

As shown in FIG. 4, Application Resource Optimizer 402 may receive input 314 that includes the priority associated with each MEC application 140. Application Resource Optimizer 402 may receive input 314 from, for example, an application developer. Application Resource Optimizer 402 may additionally receive input 412 that indicates the resource requirements of application components. For example, input 412 may indicate the computer/storage needs per application component.

Performance Tracker 404 may receive input 414, which includes the application component performance for different MEC applications 140. Performance Tracker 404 may receive input 414 from, for example, MEC network 130. Input 414 may indicate how different components of each MEC application 140 hosted at MEC network 130 are performing based on, for example, quality of service (QoS) or service level agreement (SLA) requirements for each MEC application 140. Performance Tracker 404 may determine any changes in computing resources and/or storage required based on the received component performance information for each MEC application 140. Application Resource Optimizer 402 may receive input 416 from Performance Tracker 414 indicating the changes in computing and/or storage resources for the application components.

Application Resource Optimizer 402 may determine the resources available per MEC application 140 and, as shown by arrow 418, may output information associated with the resources per MEC application 140 to Application Component Selector 406. Application Component Selector 406 may additionally receive input 420 indicating user information associated with users accessing the MEC applications 140 hosted at MEC network 130. For example, input 420 may indicate data to be accessed by users, performance parameters required by users, locations of users, and/or additional information associated with the users. Application Component Selector 406 may use input 418 received from Application Resource Optimizer 402 and input 420 including the user information to determine application components that are required for MEC applications 140 and/or application components to adjust.

As shown by arrow 422, Application Component Selector 406 may output information associated with the selected components and Application Stitcher 408 may receive the information and design optimized MEC applications 140 for orchestration. As shown by arrow 424, Application Stitcher 408 may output re-designed and/or optimized applications based on the application requirements, application priority, current application performance, and user information. By adjusting the application design and/or execution in real-time based on available resources and user needs, users accessing MEC applications 140 from MEC network 130 may experience a higher quality of service.

Figure 5:
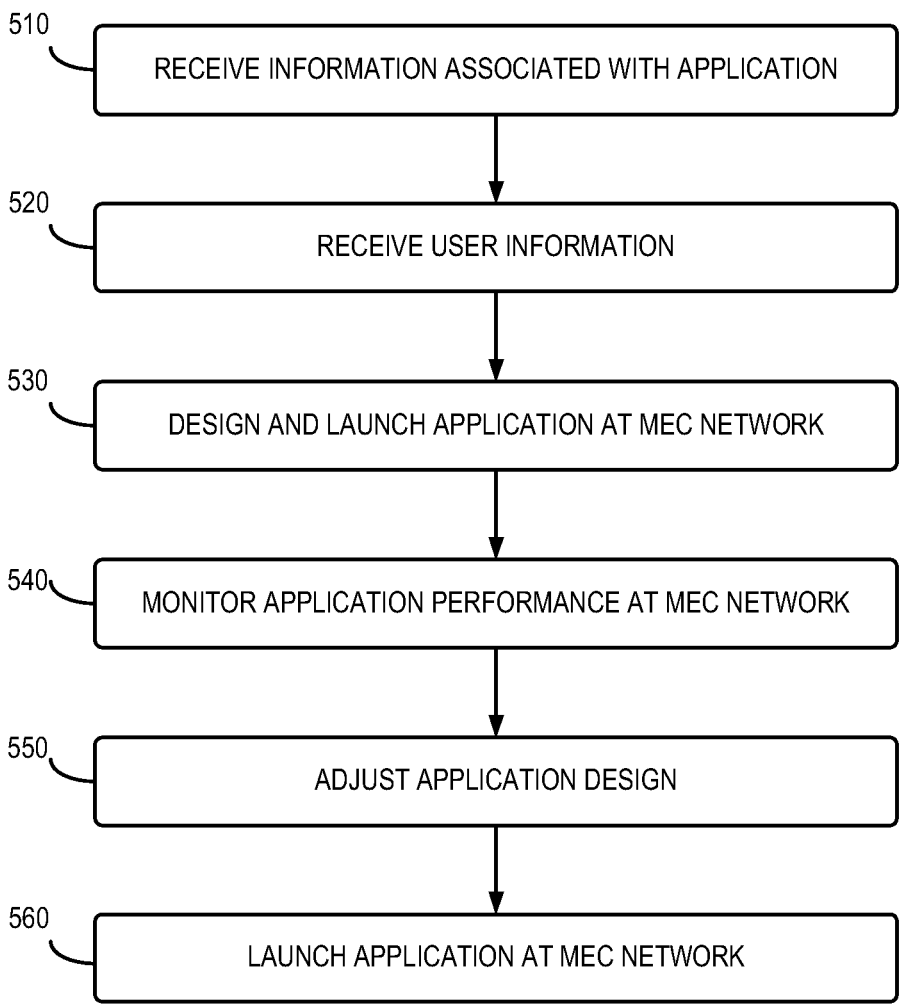
FIG. 5 is a flow diagram illustrating a process for performing application priority optimization according to an implementation herein.
Figure 6:
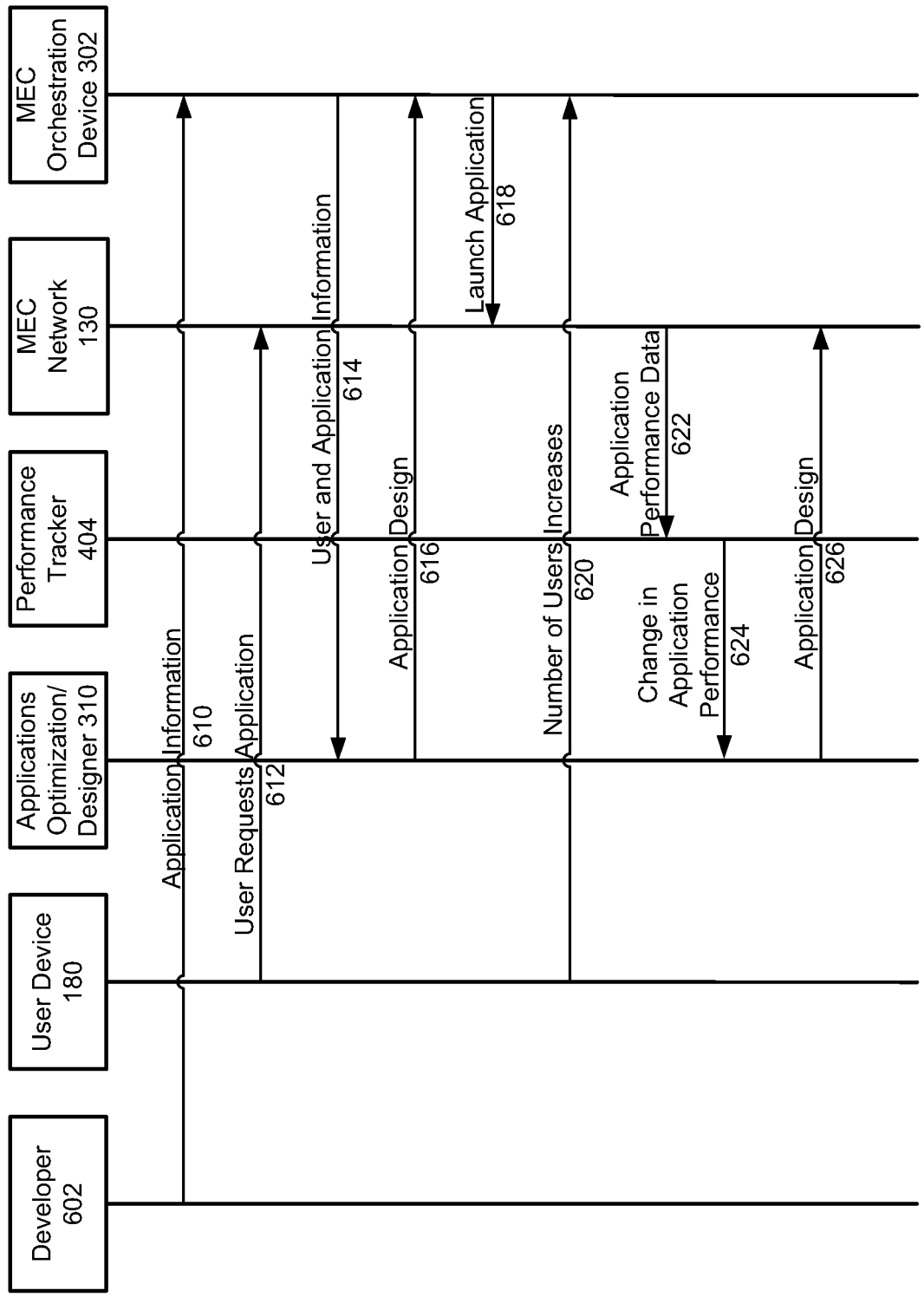
FIG. 6 is a diagram illustrating communications for performing application priority optimization according to an implementation herein.

FIG. 5 is a flow diagram illustrating a process 500 for performing application priority optimization in MEC network 130. FIG. 6 is a diagram illustrating communications for performing application priority optimization in MEC network 130. FIG. 6 includes developer 602, user device 180, Applications Optimizer/Designer 310, Performance Tracker 404, MEC network 130, and MEC orchestration device 302.

Process 500 may begin by receiving information associated with a MEC application 140 (block 510). As shown in FIG. 6, developer 602 may transmit application information 610 associated with a MEC application 140 to MEC orchestration device 302. For example, the developer 602 of MEC application 140 may transmit to MEC orchestration device 302 information such as application components associated with the a MEC application 140, a priority associated with the a MEC application 140, types of users that may access or use different components of the a MEC application 140, etc.

Process 500 may continue by receiving user information (block 520). As shown by arrow 612 in FIG. 6, when user device 180 requests to use an application, user information associated with user device 180 may be transmitted to MEC network 130. MEC orchestration device 302 may transmit a message 614 with the user information and the application information to Applications Optimizer/Designer 310. Continuing with FIG. 5, the application may be designed, received, and launched at MEC network 130 (block 530). As shown in FIG. 6, Applications Optimizer/Designer 310 may design and/or deploy the application based on the application information and user information and may transmit the application and/or application requirements to MEC orchestration device 302 (616). MEC orchestration device 302 may orchestrate and deploy the MEC application 140. For example, MEC orchestration device 302 may transmit the MEC application 140 to MEC network 130 and the application may be launched at MEC network 130 using default resources of the MEC network (618).

Returning to FIG. 5, the performance of the MEC application 140 may be monitored/tracked (block 540). As shown in FIG. 6, the number of user devices 180 accessing applications at MEC network 130 may increase (620). MEC network 130 may monitor the performance of the MEC application 140, such as latency, throughput, etc., and send application performance data 622 to Performance Tracker 404. In one implementation, as the number of user devices 180 increases, the requirements associated with execution of the MEC applications 140 at MEC network 130 may increase and the resources at the MEC network 130 may reach capacity. Performance Tracker 404 may determine the changes in the application performance and may send application performance information to Applications Optimizer/Designer 310 (624).

Returning to FIG. 5, the design and/or execution of the MEC application 140 may be adjusted based on the application performance, the application data, and the user data (block 550) and the re-designed application may be launched (block 560). As shown in FIG. 6, Applications Optimizer/Designer 310 may adjust the design and/or execution of the MEC application 140 and may send the MEC application 140 to MEC network 130 to be launched (626). For example, Applications Optimizer/Designer 310 may adjust components of the MEC application 140 based on the performance, the application priority, the users accessing the application, and/or additional data. For example, Applications Optimizer/Designer 310 may prioritize use of resources associated with particular users of MEC application 140 based on received priority information for these particular users. The design and/or execution may be orchestrated and the MEC application 140 may be executed at MEC network 130 based on the modifications. In this way, the applications hosted at MEC network 130 may be adjusted in real-time based on the resources required by the MEC applications 140 hosted at MEC network 130, the priority of the MEC applications 140, the users of the applications, the resources available at MEC network 130, and other real-time information.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5 and a series of communications have been described with regard to FIG. 6, the order of the blocks and communications may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 210, etc.), or a combination of hardware and software (e.g., software 220).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 210) of a device. A non-transitory storage medium includes one or more of the storage mediums described in relation to memory/storage 215.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    receiving application information associated with an application to be deployed at a Multi-access Edge Computing (MEC) network;
    determining parameters associated with execution of the application based on the application information;
    deploying the application at the MEC network;
    obtaining information associated with performance of the application;
    adjusting resources allocated for execution of the application based on the performance of the application;
    modifying the application based on at least one of the performance of the application or the application information;
    adjusting a component of the application based on a priority associated with the application; and
    executing the modified application at the MEC network.

2. The method of claim 1, further comprising:
    receiving user information associated with one or more users accessing the application; and
    wherein determining the parameters associated with the execution of the application includes determining the parameters based on the user information.

3. The method of claim 1, wherein the application information includes an application priority.

4. The method of claim 1, wherein the application information includes at least one of application resource requirements, application storage requirements, or application network requirements.

5. The method of claim 1, wherein the application information includes information regarding application features associated with types of users.

6. The method of claim 1, wherein adjusting resources allocated for the execution of the application comprises adjusting at least one of compute, storage or network resources based on one or more users accessing the application.

7. The method of claim 1, wherein the obtaining information associated with performance of the application comprises obtaining information based on at least one of quality of service or service level agreement requirements for the application.

8. A system comprising:
one or more processors configured to:
receive application information associated with an application to be deployed at a Multi-access Edge Computing (MEC) network;
determine parameters associated with execution of the application based on the application information;
deploy the application at the MEC network;
obtain information associated with performance of the application;
adjust resources allocated for execution of the application based on the performance of the application;
modify the application based on at least one of the performance of the application or the application information;
adjust a component of the application based on a priority associated with the application; and
execute the modified application at the MEC network.

9. The system of claim 8, wherein the one or more processors are further configured to:
receive user information associated with one or more users accessing the application; and
wherein, when determining the parameters associated with the execution of the application, the one or more processors are further configured to determine the parameters based on the user information.

10. The system of claim 8, wherein the application information includes a priority associated with the application.

11. The system of claim 8, wherein the application information includes at least one of resource requirements, storage requirements, or network requirements associated with the application.

12. The system of claim 8, wherein the application information includes information regarding application features associated with types of users.

13. The system of claim 8, wherein, when adjusting resources allocated for the execution of the application, the one or more processors are further configured to adjust at least one of compute, storage or network resources based on one or more users accessing the application.

14. A non-transitory, computer-readable storage medium storing instructions executable by one or more processors of one or more devices, which when executed cause the one or more devices to:
receive application information associated with an application to be deployed at a Multi-access Edge Computing (MEC) network;
determine parameters associated with execution of the application based on the application information;
deploy the application at the MEC network;
obtain information associated with performance of the application;
adjust resources allocated for execution of the application based on the performance of the application;
modify the application based on at least one of the performance of the application or the application information;
adjust a component of the application based on a priority associated with the application; and
execute the modified application at the MEC network.

15. The non-transitory, computer-readable storage medium of claim 14, further comprising instructions to:
receive user information associated with one or more users accessing the application; and
wherein the instructions to determine the parameters associated with the execution of the application further comprise instructions to determine the parameters based on the user information.

16. The non-transitory, computer-readable storage medium of claim 14, wherein the application information includes a priority associated with the application.

17. The non-transitory, computer-readable storage medium of claim 14, wherein the application information includes at least one of resource requirements, storage requirements, or network requirements associated with the application.

18. The non-transitory, computer-readable storage medium of claim 14, wherein the application information includes information regarding application features associated with types of users.

19. The non-transitory, computer-readable storage medium of claim 14, further comprising instructions to modify the execution of the application based on a priority associated with the application or based on one or more users accessing the application.

20. The non-transitory, computer-readable storage medium of claim 14, wherein when adjusting resources allocated for execution of the application, the instructions cause the one or more devices to adjust at least one of compute, storage or network resources based on one or more users accessing the application.

* * * * *